United States Patent
Gan et al.

(10) Patent No.: US 11,588,822 B2
(45) Date of Patent: Feb. 21, 2023

(54) RIGHT CONTROL METHOD AND APPARATUS FOR TERMINAL DEVICE

(71) Applicants: Beijing Jingdong Shangke Information Technology Co., Ltd., Beijing (CN); Beijing Jingdong Century Trading Co., Ltd., Beijing (CN)

(72) Inventors: Shuo Gan, Beijing (CN); Wenming Zhe, Beijing (CN); Qi Hu, Beijing (CN)

(73) Assignees: Beijing Jingdong Shangke Information Technology Co., Ltd., Beijing (CN); Beijing Jingdong Century Trading Co., Ltd., Beijing (CN)

(*) Notice: Subject to any disclaimer, the term of this patent is extended or adjusted under 35 U.S.C. 154(b) by 154 days.

(21) Appl. No.: 16/651,869

(22) PCT Filed: Apr. 4, 2018

(86) PCT No.: PCT/CN2018/081959
§ 371 (c)(1),
(2) Date: Mar. 27, 2020

(87) PCT Pub. No.: WO2019/076002
PCT Pub. Date: Apr. 25, 2019

(65) Prior Publication Data
US 2020/0259838 A1 Aug. 13, 2020

(30) Foreign Application Priority Data
Oct. 19, 2017 (CN) .......................... 201710975866.8

(51) Int. Cl.
*H04L 9/40* (2022.01)

(52) U.S. Cl.
CPC .......... *H04L 63/102* (2013.01); *H04L 63/083* (2013.01)

(58) Field of Classification Search
CPC . G03G 15/5066; H04L 9/0891; H04L 9/3247; H04L 27/2602; H04L 63/102;
(Continued)

(56) References Cited

U.S. PATENT DOCUMENTS 7,062,189 B2 6/2006 Hirano
9,444,795 B1* 9/2016 Kowalski ................ H04L 67/02
(Continued)

FOREIGN PATENT DOCUMENTS

CN 101593260 A 12/2009
CN 101834878 A 9/2010
(Continued)

OTHER PUBLICATIONS

International Search Report and Written Opinion for PCT/CN2018/081959, dated Jul. 9, 2018, 2 pages.
(Continued)

*Primary Examiner* — Dustin Nguyen
(74) *Attorney, Agent, or Firm* — Blank Rome LLP (57) ABSTRACT

A permission control method and apparatus for a terminal device, where the method includes: acquiring, in response to detecting a login operation of the target user on the target application, from the server, a permission control code of the target user for the target application; processing the permission control code into at least one permission code, the permission code being used to indicate that a user has a use permission for a corresponding functionality of the target application; and controlling, on the basis of the at least one permission code, the use of at least one functionality of the target application by the target user.

18 Claims, 6 Drawing Sheets

(58) Field of Classification Search
CPC ..... H04L 9/3226; H04L 9/3231; H04L 63/20;
H04L 63/0428; H04L 67/02; G06F
3/1238; G06F 21/6236; G06F 9/44; G06F
12/1491; G06F 21/44; G06F 21/6218;
G06F 21/629; G06F 21/6281; H04M
1/67; G06Q 20/38215
See application file for complete search history.

(56) References Cited

U.S. PATENT DOCUMENTS

| | | | | |
|---|---|---|---|---|
| 2002/0095571 | A1* | 7/2002 | Bradee | G06F 21/6236 713/164 |
| 2003/0079136 | A1* | 4/2003 | Ericta | H04L 63/102 713/185 |
| 2005/0123316 | A1* | 6/2005 | Hirano | G03G 15/5066 399/80 |
| 2010/0180339 | A1* | 7/2010 | Finlayson | G06F 21/6218 726/21 |
| 2012/0246740 | A1* | 9/2012 | Brooker | G06F 21/629 726/28 |
| 2012/0304280 | A1* | 11/2012 | Hayashida | G06F 21/629 726/16 |
| 2014/0215496 | A1* | 7/2014 | Sexton | H04M 1/67 719/318 |
| 2014/0355034 | A1* | 12/2014 | Mihara | G06F 3/1238 358/1.14 |
| 2015/0135296 | A1 | 5/2015 | Cason et al. | |
| 2016/0063258 | A1* | 3/2016 | Ackerly | G06F 21/6281 713/189 |
| 2016/0063314 | A1* | 3/2016 | Samet | G06F 21/44 348/78 |
| 2016/0182485 | A1 | 6/2016 | Zhao et al. | |
| 2017/0352028 | A1* | 12/2017 | Vridhachalam | G06Q 20/38215 |
| 2017/0372094 | A1* | 12/2017 | Hore | H04L 63/0428 |
| 2018/0227290 | A1* | 8/2018 | Yang | H04L 9/3228 |
| 2018/0316676 | A1* | 11/2018 | Gilpin | H04L 9/0891 |
| 2019/0199750 | A1* | 6/2019 | Chen | H04L 63/20 |
| 2020/0099673 | A1* | 3/2020 | Zhang | H04L 9/3247 |
| 2020/0187265 | A1* | 6/2020 | Luo | H04L 27/2602 |
| 2021/0152359 | A1* | 5/2021 | Kim | H04L 9/3231 |

FOREIGN PATENT DOCUMENTS

| | | | | |
|---|---|---|---|---|
| CN | 101894231 | A | 11/2010 | |
| CN | 104503752 | A | 4/2015 | |
| CN | 105450581 | A | 3/2016 | |
| JP | 2017/175491 | A | 9/2017 | |
| WO | WO-02101504 | A2 * | 12/2002 | G06F 12/1491 |
| WO | WO-2019076002 | A1 * | 4/2019 | G06F 9/44 |

OTHER PUBLICATIONS

Z. De-cai et al., "New Database Designing Method of Jurisdiction Management in M Is", Journal of Chengde Petroleum College, vol. 8, No. 1, Mar. 2006, 3 pages.

* cited by examiner

RIGHT CONTROL METHOD AND APPARATUS FOR TERMINAL DEVICE

CROSS-REFERENCE TO RELATED APPLICATIONS

This application is a US national stage of International Application No. PCT/CN2018/081959, filed Apr. 4, 2018, which claims the priority of Chinese Patent Application No. 201710975866.8, entitled "Right Control Method and apparatus for Terminal Device," filed on Oct. 19, 2017, the content of which is incorporated herein by reference in its entirety.

TECHNICAL FIELD

The present disclosure relates to the field of computer technologies, specifically to the field of Internet technologies, and more specifically to a permission control method and apparatus for a terminal device.

BACKGROUND

With the popularity of electronic smart products, various types of applications are emerging. Applications carry more and more functions, and each functionality has its corresponding permission. However, in the prior art, the number of permissions that may be carried is limited, and the flexibility in expending permissions is poor.

SUMMARY

An object of the present disclosure is to provide an improved permission control method and apparatus for a terminal device, to solve a part of technical problems as mentioned in the background portion.

In a first aspect, an embodiment of the present disclosure provides a permission control method for a terminal device, the terminal device being in communication connection with a server pre-stored with a permission control code, and the permission control code being used to indicate a permission of a target user for using at least one functionality of a target application installed in the terminal device, the method including: acquiring, in response to detecting a login operation of the target user on the target application, from the server, a permission control code of the target user for the target application; processing the permission control code into at least one permission code, the permission code being used to indicate that a user has a use permission for a corresponding functionality of the target application; and controlling, on the basis of the at least one permission code, the use of at least one functionality of the target application by the target user.

In some embodiments, the permission control code is a product of at least one permission code, and the permission code is a prime number; and before acquiring from the server, a permission control code of the target user for the target application, the method further includes: acquiring a corresponding relationship between each functionality of the at least one functionality and a permission code, where each functionality corresponds to a different permission code.

In some embodiments, the processing the permission control code into at least one permission code, includes: performing prime factorization on the permission control code to obtain the at least one permission code.

In some embodiments, the processing the permission control code into at least one permission code, includes: determining whether the permission control code is divisible by a specified permission code; and determining, in response to determining the permission control code being divisible by the specified permission code, that the specified permission code is the at least one permission code.

In some embodiments, a number of permission control codes corresponding to the target user is at least two.

In some embodiments, the controlling, on the basis of the at least one permission code, the use of at least one functionality of the target application by the target user, includes: receiving a use request operation of the target user on a target functionality of the target application; opening, in response to determining the target functionality being a functionality corresponding to a permission code in the at least one permission code, a use permission of the target functionality to the target user; and restricting, in response to determining the target functionality being not a functionality corresponding to the permission code in the at least one permission code, the use permission of the target functionality to the target user.

In a second aspect, an embodiment of the present disclosure provides a permission control apparatus for a terminal device, the terminal device being in communication connection with a server pre-stored with a permission control code, and the permission control code being used to indicate a permission of a target user for using at least one functionality of a target application installed in the terminal device, the apparatus including: a detecting unit, configured to acquire, in response to detecting a login operation of the target user on the target application, from the server, a permission control code of the target user for the target application; a processing unit, configured to process the permission control code into at least one permission code, the permission code being used to indicate that a user has a use permission for a corresponding functionality of the target application; and a controlling unit, configured to control, on the basis of the at least one permission code, the use of at least one functionality of the target application by the target user.

In some embodiments, the permission control code is a product of at least one permission code, and the permission code is a prime number; and the apparatus further includes: an acquiring unit, configured to acquire a corresponding relationship between each functionality of the at least one functionality and a permission code, wherein each functionality corresponds to a different permission code.

In some embodiments, the processing unit is further configured to: perform prime factorization on the permission control code to obtain the at least one permission code.

In some embodiments, the processing unit is further configured to: determine whether the permission control code is divisible by a specified permission code; and determine, in response to determining the permission control code being divisible by the specified permission code, that the specified permission code is the at least one permission code.

In some embodiments, the controlling unit includes: a receiving module, configured to receive a use request operation of the target user on a target functionality of the target application; an opening module, configured to open, in response to determining the target functionality being a functionality corresponding to a permission code in the at least one permission code, a use permission of the target functionality to the target user; and a restriction module, configured to restrict, in response to determining the target functionality being not a functionality corresponding to the permission code in the at least one permission code, the use permission of the target functionality to the target user.

In a third aspect, an embodiment of the present disclosure provides a terminal device, including: one or more processors; and a storage apparatus, for storing one or more programs, the one or more programs, when executed by the one or more processors, cause the one or more processors to implement the method according to any embodiment of the permission control method.

In a fourth aspect, an embodiment of the present disclosure provides a computer readable storage medium, storing a computer program thereon, the program, when executed by a processor, implements the method according to any embodiment of the permission control method.

The permission control method and apparatus for a terminal device provided by the embodiments of the present disclosure, by acquiring, in response to detecting a login operation of the target user on the target application, from the server, a permission control code of the target user for the target application; then processing the permission control code into at least one permission code, the permission code being used to indicate that a user has a use permission for a corresponding functionality of the target application; and finally controlling, on the basis of the at least one permission code, the use of at least one functionality of the target application by the target user. The method provided by the embodiments of the present disclosure has strong flexibility in extending user permissions of functionalities of an application for the user.

BRIEF DESCRIPTION OF THE DRAWINGS

By reading the detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
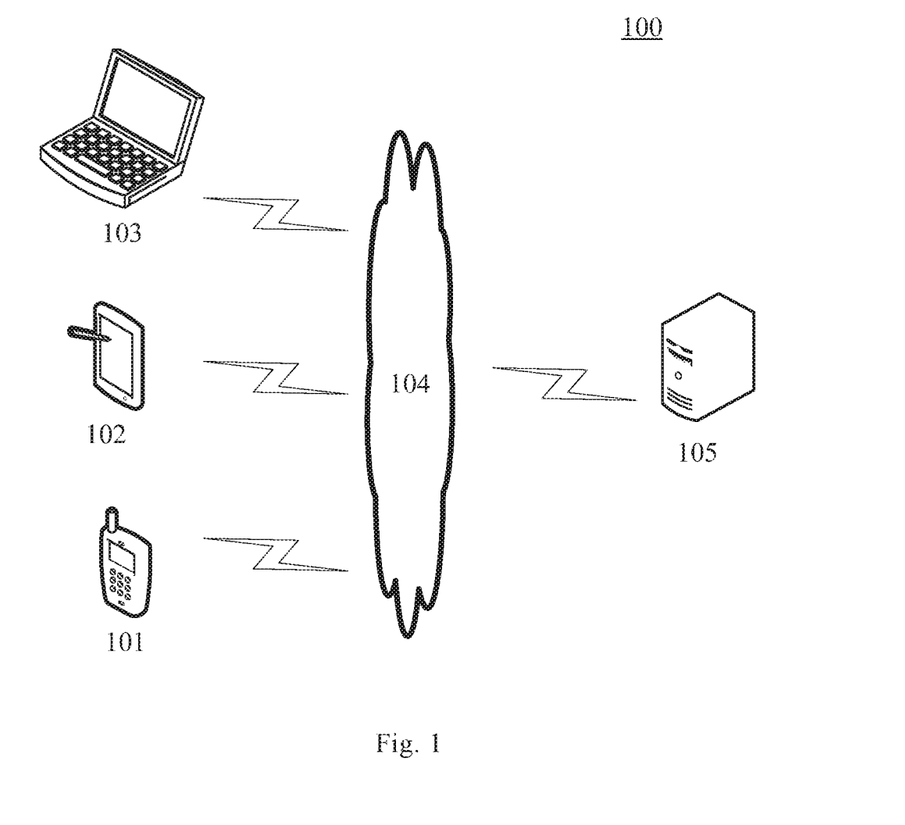
FIG. 1 is a diagram of an exemplary system architecture in which an embodiment of the present disclosure may be implemented.

FIG. 1 illustrates an exemplary system architecture 100 of an embodiment in which a permission control method for a terminal device or a permission control apparatus for a terminal device of the present disclosure may be applied.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may interact with the server 105 through the network 104 using the terminal devices 101, 102, 103, to receive or send messages and the like. Various communication client applications, such as web browser applications, shopping applications, search applications, instant communication tools, mailbox clients, or social platform software, may be installed on the terminal devices 101, 102, and 103.

The terminal devices 101, 102, 103 may be various electronic devices having information transmitting and receiving functions, including but not limited to smart phones, tablets, e-book readers, MP3 (Moving Picture Experts Group Audio Layer III) players, MP4 (Moving Picture Experts Group Audio Layer IV) players, laptop portable computers and desktop computers, and the like.

The server 105 may be a server that provides various services, such as a backend server that provides services to applications on the terminal devices 101, 102, 103. The backend server may send a permission control code to the terminal devices 101, 102, 103 after the terminal devices 101, 102, 103 detect a login operation of a target user on a target application via acquisition of the terminal devices 101, 102, and 103.

It should be noted that the permission control method for a terminal device provided by the embodiments of the present disclosure is generally performed by the terminal devices 101, 102, 103. Accordingly, the permission control apparatus for a terminal device is generally provided in the terminal devices 101, 102, and 103.

It should be understood that the number of terminal devices, networks, and servers in FIG. 1 is merely illustrative. Depending on the implementation needs, there may be any number of terminal devices, networks, and servers.

Figure 2:
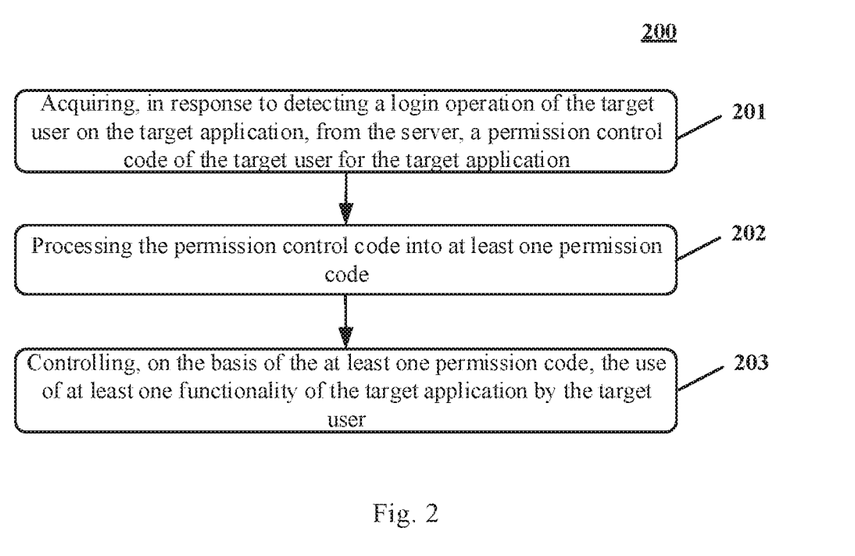
FIG. 2 is a flowchart of an embodiment of a permission control method for a terminal device according to the present disclosure.

With further reference to FIG. 2, a flow 200 of an embodiment of a permission control method for a terminal device according to the present disclosure is illustrated. The permission control method for a terminal device includes the following steps.

Step 201, acquiring, in response to detecting a login operation of the target user on the target application, from the server, a permission control code of the target user for the target application.

In the present embodiment, the terminal device is in communication connection with a server pre-stored with a permission control code, and the permission control code is used to indicate a permission of a target user for using at least one functionality of a target application installed in the terminal device. The terminal device (such as the terminal devices shown in FIG. 1) on which the permission control method for a terminal device operates may respond after detecting the target user's login operation on the target application: acquiring from the server, a permission control code of the target user for the target application through a wired connection or a wireless connection.

The permission control code may be one character or a plurality of characters. The target user in users and the target application in applications may be manually set, or may be randomly selected or calculated by the machine. The target application may implement a plurality of functions for the user, and the selected target user may have a permission to use at least one functionality of the target application. Here, the number of permission control codes corresponding to the target user may be one, or may be two or more.

In some alternative implementations of the present embodiment, the number of permission control codes corresponding to the target user is at least two.

In the present embodiment, because basic data types in a system have a value range restriction, the value of the permission control code cannot be infinitely expanded. In order to reduce the restriction in value, at least two permission control codes may be set for a user to give the user more permissions on the target application.

Step 202, processing the permission control code into at least one permission code.

In the present embodiment, the terminal device processes the permission control code acquired from the server into at least one permission code. The permission code is used to indicate that the user has a use permission for a corresponding functionality of the target application, and may be various characters. The permission control code may be equal to one permission code or the product of two or more permission codes. For example, the permission code may be a prime number, for example, it may be 2, 3, and the permission control code is the product of 2 and 3, which is 6. Each permission code corresponds to the user's permission to use a certain functionality of the target application. Therefore, a certain functionality here is a functionality corresponding to the permission code.

In practice, there may be a plurality of processing methods. For example, the permission control code may be decomposed to obtain at least one permission code. It is also possible to perform a preset operation on the permission control code.

Here, the at least one permission code may be at least two permission codes.

Step 203, controlling, on the basis of the at least one permission code, the use of at least one functionality of the target application by the target user.

In the present embodiment, the terminal device determines, on the basis of the at least one permission code, a use permission of at least one functionality of the target application by the target user, thereby controlling the use of the at least one functionality of the target application by the target user. Generally speaking, one permission corresponds to one permission code. Because the permission code may indicate the target user's permission to a functionality of the target application, the terminal device may open certain functions of the target application to the target user, or prohibit the target user from using certain functions of the target application based on the at least one permission code.

Figure 3:
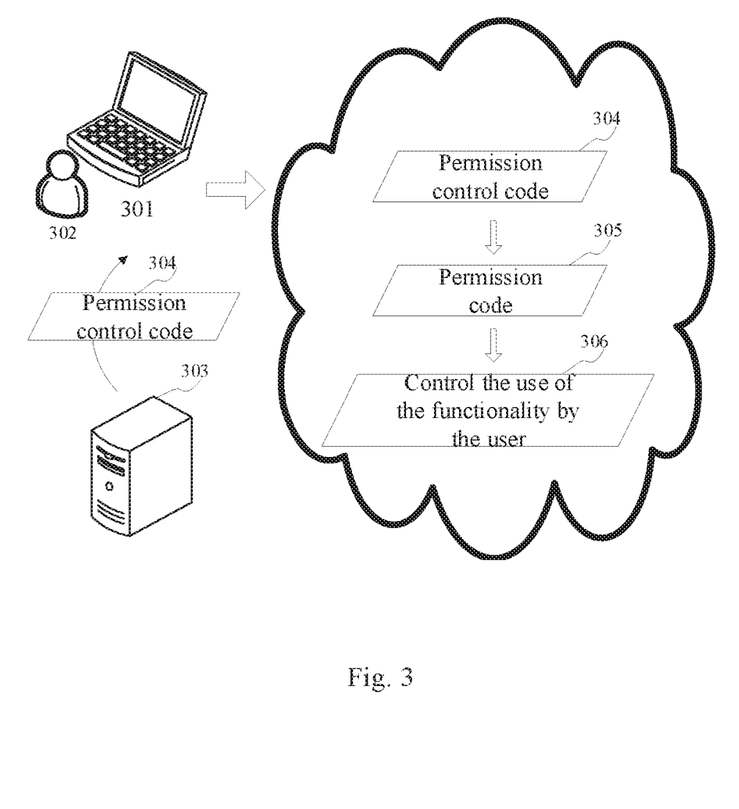
FIG. 3 is a schematic diagram of an application scenario of the permission control method for a terminal device according to the present disclosure.

With further reference to FIG. 3, FIG. 3 is a schematic diagram of an application scenario of the permission control method for a terminal device according to the present embodiment. In the application scenario of FIG. 3, user 302 first performs a login operation on application A. A terminal device 301 is in communication connection with a server 303 pre-stored with a permission control code, and the permission control code is used to indicate a permission of the user 302 for using at least one functionality of the application A installed in the terminal device 301. Then, the terminal device 301 responds after detecting the login operation of the user 302 to the application A: acquiring a permission control code 304 of the user 302 to the application A from the server 303. Then, the terminal device processes the permission control code 304 into three permission codes 305. The permission codes 305 are used to indicate that the user has use permissions for corresponding functions of the application A. Finally, the terminal device controls the use 306 of three functionalities of the application A by the user 302 based on the above three permission codes 305.

The method provided by the embodiments of the present disclosure has strong flexibility in extending use permissions of functions of an application for the user.

Figure 4:
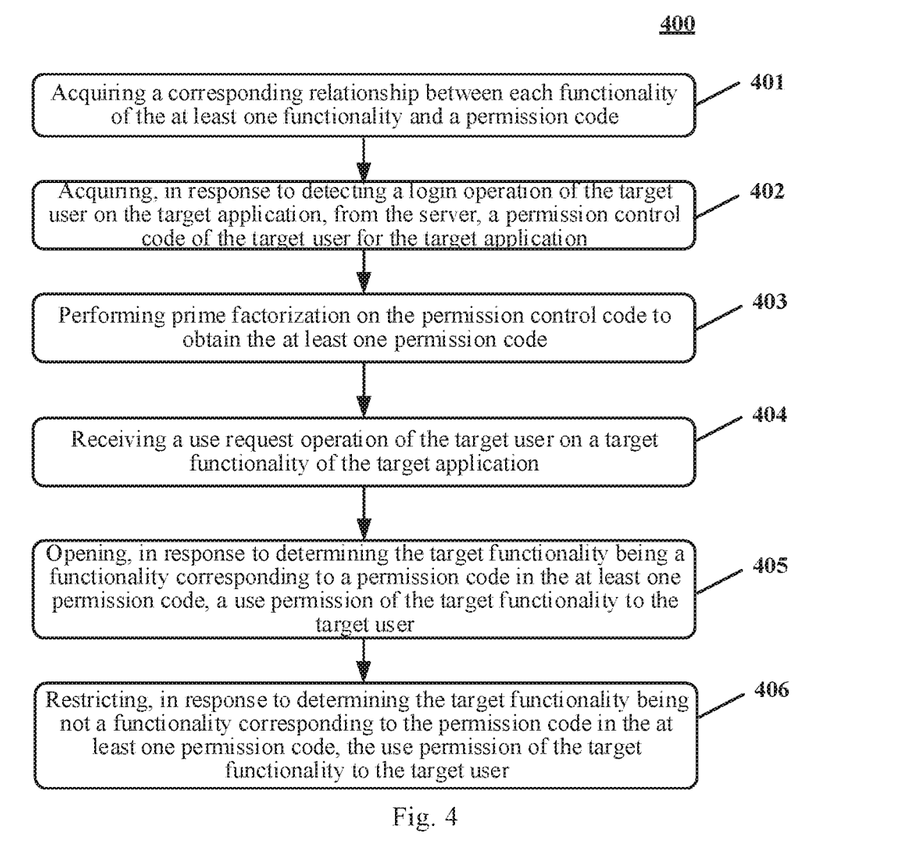
FIG. 4 is a flowchart of another embodiment of the permission control method for a terminal device according to the present disclosure.

With further reference to FIG. 4, a flow 400 of another embodiment of the permission control method for a terminal device is illustrated. The flow 400 of the permission control method for a terminal device includes the following steps.

Step 401, acquiring a corresponding relationship between each functionality of the at least one functionality and a permission code.

In the present embodiment, the server has already established corresponding relationships between functionalities and permission codes in advance. There is a one-to-one corresponding relationship between the user's permission to use a certain functionality and a permission code. Each functionality corresponds to a different permission code. The terminal device acquires the corresponding relationship between each functionality of the at least one functionality and the permission code. The permission control code is a product of at least one permission code, and the permission code is a prime number. If the permission code is a prime number, the composition of the permission control code relative to the permission code is uniquely determined, which is more convenient for the terminal device to determine the user's permission to use the target application through the permission code.

Step 402, acquiring, in response to detecting a login operation of the target user on the target application, from the server, a permission control code of the target user for the target application.

In the present embodiment, the terminal device is in communication connection with a server pre-stored with a permission control code, and the permission control code is used to indicate that a permission of a target user for using at least one functionality of a target application installed in the terminal device. An electronic device on which the permission control method for a terminal device operates may respond after detecting the target user's login operation on the target application: acquiring from the server, a permission control code of the target user for the target application through a wired connection or a wireless connection.

The permission control code may be one numeral or a plurality of numerals. The target user in users and the target application in applications may be manually set, or may be randomly selected or calculated by the machine. The target application may implement a plurality of functions for the user, and the selected target user may have a permission to use at least one functionality of the target application.

Step 403, performing prime factorization on the permission control code to obtain the at least one permission code.

In the present embodiment, the electronic device performs prime factorization on the permission control code to obtain the at least one permission code. The permission control code is a composite number obtained by multiplying prime factors as the permission code. If the permission control code is equal to one permission code, then one permission code may be obtained after the prime factorization of the permission control code. If the permission control code is the product of two or more permission codes, then two or more permission codes may be obtained after the prime factorization of the permission control code.

A plurality of methods may be used to perform the prime factorization (for example, the pollard rho factorization algorithm).

Step 404, receiving a use request operation of the target user on a target functionality of the target application.

In the present embodiment, the terminal device may receive the use request operation of the target user on the target functionality of the target application. Here, the target functionality refers to a functionality in the functionalities of the target application that the user may use. The use request operation is an operation performed by the user on the terminal device to request to use the target functionality of the target application.

Step 405, opening, in response to determining that the target functionality is a functionality corresponding to a permission code in the at least one permission code, a use permission of the target functionality to the target user.

In the present embodiment, after determining that the target functionality is the functionality corresponding to the permission code in the at least one permission code, the terminal device responds: opening the use permission of the target functionality to the target user, so that the user can use the target functionality.

Step 406, restricting, in response to determining that the target functionality is not a functionality corresponding to the permission code in the at least one permission code, the use permission of the target functionality to the target user.

In the present embodiment, after determining that the target functionality is not the functionality corresponding to the permission code in the at least one permission code, the terminal device responds: restricting the use permission of the target functionality to the target user, so that the target user cannot use the target functionality.

In the present embodiment, the permission control code is decomposed to obtain the permission code more accurately. At the same time, based on the permission code, it may be determined whether to open or restrict the use permission of the target functionality to the target user.

Figure 5:
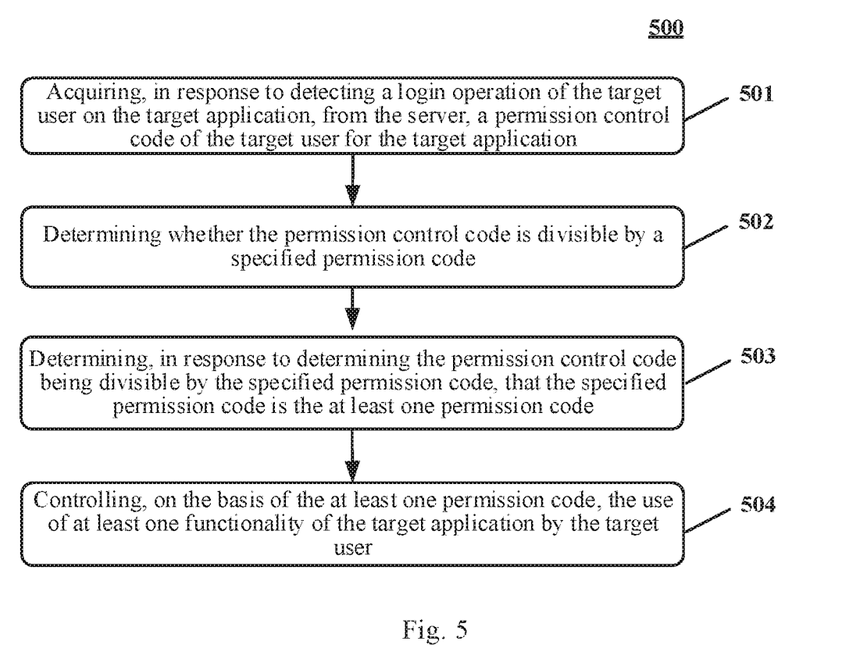
FIG. 5 is a flowchart of another embodiment of the permission control method for a terminal device according to the present disclosure.

With further reference to FIG. 5, a flow 500 of another embodiment of the permission control method for a terminal device is illustrated. The flow 500 of the permission control method for a terminal device includes the following steps.

Step 501, acquiring, in response to detecting a login operation of the target user on the target application, from the server, a permission control code of the target user for the target application.

In the present embodiment, the terminal device is in communication connection with a server pre-stored with a permission control code, and the permission control code is used to indicate a permission of a target user for using at least one functionality of a target application installed in the terminal device. The terminal device (such as the terminal devices shown in FIG. 1) on which the permission control method for a terminal device operates may respond after detecting the target user's login operation on the target application: acquiring from the server, a permission control code of the target user for the target application through a wired connection or a wireless connection.

The permission control code may be one numeral or a plurality of numerals. The target user in users and the target application in applications may be manually set, or may be randomly selected or calculated by the machine. The target application may implement a plurality of functionalities for the user, and the selected target user may have a permission to use at least one functionality of the target application.

Step 502, determining whether the permission control code is divisible by a specified permission code.

In the present embodiment, the terminal device determines whether the permission control code is divisible by the specified permission code. The specified permission code indicates the user's permission to a specified functionality. The terminal device may not perform the calculation of decomposing prime factors, and only divide by the specified permission code to determine whether the target user has the permission to use the functionality corresponding to the specified permission code.

Step 503, determining, in response to determining that the permission control code being divisible by the specified permission code, that the specified permission code is the at least one permission code.

In the present embodiment, in response to determining that the permission control code is divisible by the specified permission code, the terminal device may determine that the target user has the permission to use the functionality corresponding to the specified permission code, thereby responding: determining that the specified permission code is the at least one permission code of the permission control code.

Step 504, controlling, on the basis of the at least one permission code, the use of at least one functionality of the target application by the target user.

In the present embodiment, the terminal device determines, on the basis of the at least one permission code, a use permission of the target user to at least one functionality of the target application, thereby controlling the use of the at least one functionality of the target application by the target user. Generally speaking, one permission corresponds to one permission code. Because the permission code may indicate the target user's permission to the target application, the terminal device may open certain functionalities of the target application to the target user, or prohibit the target user from using certain functionalities of the target application based on the permission code.

In the present embodiment, the permission control code may not be decomposed, but the at least one permission code may be determined by determining the permission control code being divisible by the specified permission code.

Figure 6:
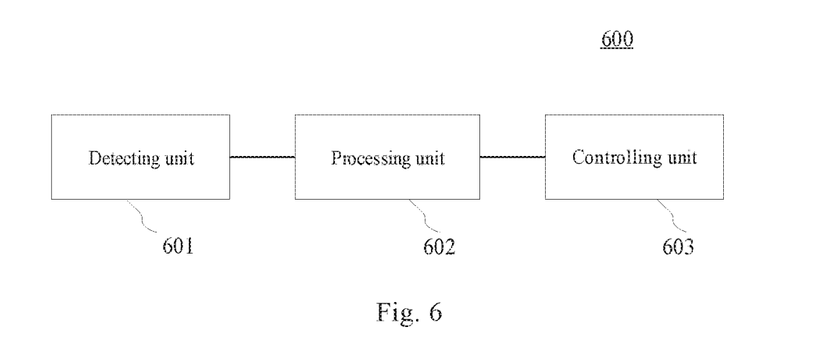
FIG. 6 is a schematic structural diagram of an embodiment of a permission control apparatus for a terminal device according to the present disclosure.

With further reference to FIG. 6, as an implementation of the method shown in the above figures, the present disclosure provides an embodiment of a permission control apparatus for a terminal device, and the apparatus embodiment corresponds to the method embodiment as shown in FIG. 2. The apparatus may be specifically applied to various electronic devices.

As shown in FIG. 6, a permission control apparatus 600 for a terminal device of the present embodiment includes: a detecting unit 601, a processing unit 602 and a controlling unit 603. The detecting unit 601 is configured to acquire, in response to detecting a login operation of the target user on the target application, from the server, a permission control code of the target user for the target application. The processing unit 602 is configured to process the permission control code into at least one permission code, the permission code being used to indicate that a user has a use permission for a corresponding functionality of the target application. The controlling unit 603 is configured to control, on the basis of the at least one permission code, the use of at least one functionality of the target application by the target user.

In the present embodiment, the detecting unit 601 of the permission control apparatus 600 for a terminal device may respond after detecting the target user's login operation on the target application: acquiring from the server, a permission control code of the target user for the target application through a wired connection or a wireless connection.

In the present embodiment, the processing unit 602 processes the permission control code into at least one permission code. The permission code is used to indicate that the user has a use permission for a corresponding functionality of the target application. The permission code is a character that constitutes the permission control code in a multiplicative relationship. The permission control code may be equal to one permission code or the product of two or more permission codes. For example, the permission code may be a prime number, for example, it may be 2, 3, and the permission control code is the product of 2 and 3, which is 6. Each permission code corresponds to the user's permission to use a certain functionality of the target application. Therefore, the certain functionality here is a functionality corresponding to the permission code.

In the present embodiment, the controlling unit 603 determines, on the basis of the at least one permission code, a use permission of at least one functionality of the target application by the target user, thereby controlling the use of the at least one functionality of the target application by the target user. Generally speaking, one permission corresponds to one permission code. Because the permission code may indicate the target user's permission to the target application, the controlling unit 603 may open certain functionalities of the target application to the target user, or prohibit the target user from using certain functionalities of the target application based on the permission code.

In some alternative implementations of the present embodiment, the permission control code is a product of at least one permission code, and the permission code is a prime number; and the apparatus further includes: an acquiring unit, configured to acquire a corresponding relationship between each functionality of the at least one functionality and a permission code, where each functionality corresponds to a different permission code.

In some alternative implementations of the present embodiment, the processing unit is further configured to: perform prime factorization on the permission control code to obtain the at least one permission code.

In some alternative implementations of the present embodiment, the processing unit is further configured to: determine whether the permission control code is divisible by a specified permission code; and determine, in response to determining the permission control code being divisible by the specified permission code, that the specified permission code is the at least one permission code.

In some alternative implementations of the present embodiment, the number of permission control codes corresponding to the target user is at least two.

In some alternative implementations of the present embodiment, the controlling unit includes: a receiving module, configured to receive a use request operation of the target user on a target functionality of the target application; an opening module, configured to open, in response to determining the target functionality being a functionality corresponding to a permission code in the at least one permission code, a use permission of the target functionality to the target user; and a restriction module, configured to restrict, in response to determining the target functionality being not a functionality corresponding to the permission code in the at least one permission code, the use permission of the target functionality to the target user.

Figure 7:
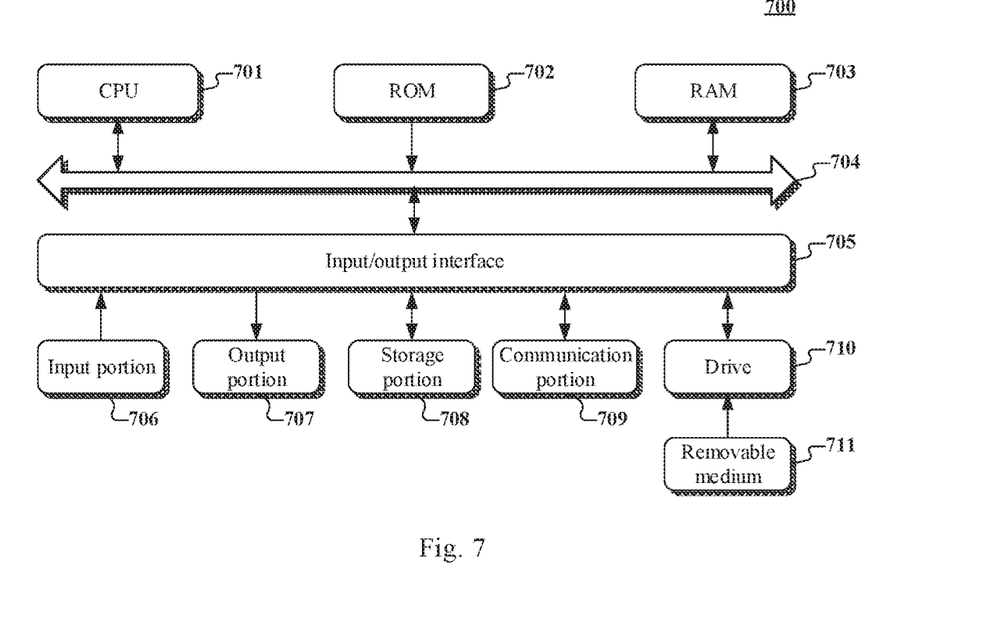
FIG. 7 is a schematic structural diagram of a computer apparatus adapted to implement a terminal device according to an embodiment of the present disclosure.

Referring to FIG. 7, a schematic structural diagram of a computer apparatus 700 adapted to implement the terminal device according to the embodiments of the present disclosure is shown. As shown in FIG. 7, the computer apparatus 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the apparatus 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse, or the like; an output portion 707 including a cathode ray tube (CRT), a liquid crystal display device (LCD), a speaker, or the like; a storage portion 708 including a hard disk, or the like; and a communication portion 709 including a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710 as required, such that a computer program read therefrom is installed in the storage portion 708 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 709, and/or may be installed from the removable media 711. The computer program, when executed by the CPU 701, implements the functions as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor, for example, may be described as: a processor including a detecting unit, a processing unit and a controlling unit. Here, the names of these units do not in some cases constitute limitations to such units themselves. For example, the detecting unit may also be described as "a unit configured to acquire, in response to detecting a login operation of the target user on the target application, from the server, a permission control code of the target user for the target application."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: receive an image of an object sent by a preset image acquisition apparatus, and perform image recognition on the image, to acquire, in response to detecting a login operation of the target user on the target application, from the server, a permission control code of the target user for the target application; process the permission control code into at least one permission code, the permission code being used to indicate that a user has a use permission for a corresponding functionality of the target application; and control, on the basis of the at least one permission code, the use of at least one functionality of the target application by the target user.

The above description only provides explanation of the preferred embodiments and the employed technical principles of the present disclosure. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the inventive concept of the present disclosure, for example, technical solutions formed by interchanging the above-described features with, but not limited to, technical features with similar functions disclosed in the present disclosure.

What is claimed is:

1. A permission control method for a terminal device, the terminal device being in communication connection with a server pre-stored with a permission control code, and the permission control code being used to indicate a permission of a target user for using at least one functionality of a target application installed in the terminal device, the method comprising:
    acquiring, in response to detecting a login operation of the target user on the target application, from the server, the permission control code of the target user for the target application, wherein the permission control code is a product of at least two permission codes, and each of the at least two permission codes is a prime number;
    processing the permission control code into at least two permission codes, each of the at least two permission codes being used to indicate that a user has a use permission for a corresponding functionality of the target application, wherein each of the at least two permission codes corresponds to one different functionality of the target application; and
    controlling, on the basis of the at least two permission codes, the use of at least two functionalities of the target application by the target user.

2. The permission control method according to claim 1, wherein
    before acquiring from the server, the permission control code of the target user for the target application, the method further comprises:
    acquiring a corresponding relationship between each functionality of the at least one functionality and a permission code, wherein each functionality corresponds to a different permission code.

3. The permission control method according to claim 2, wherein the processing the permission control code into at least two permission codes, comprises:
    performing prime factorization on the permission control code to obtain the at least two permission codes.

4. The permission control method according to claim 1, wherein the processing the permission control code into at least two permission codes, comprises:
    determining whether the permission control code is divisible by a specified permission code; and
    determining, in response to determining the permission control code being divisible by the specified permission code, that the specified permission code is one of the at least two permission codes.

5. The permission control method according to claim 1, wherein a number of permission control codes corresponding to the target user is at least two.

6. The permission control method according to claim 1, wherein the controlling, on the basis of the at least two permission codes, the use of at least two functionalities of the target application by the target user, comprises:
receiving a use request operation of the target user on a target functionality of the target application;
opening, in response to determining the target functionality being a functionality corresponding to a permission code in the at least two permission codes, a use permission of the target functionality to the target user; and
restricting, in response to determining the target functionality being not a functionality corresponding to the permission code in the at least two permission codes, the use permission of the target functionality to the target user.

7. A permission control apparatus for a terminal device, the terminal device being in communication connection with a server pre-stored with a permission control code, and the permission control code being used to indicate a permission of a target user for using at least one functionality of a target application installed in the terminal device, the apparatus comprising:
at least one processor; and
a memory storing instructions, wherein the instructions when executed by the at least one processor, cause the at least one processor to perform operations, the operations comprising:
acquiring, in response to detecting a login operation of the target user on the target application, from the server, the permission control code of the target user for the target application, wherein the permission control code is a product of at least two permission codes, and each of the at least two permission codes is a prime number;
processing the permission control code into at least two permission codes, at least two permission codes being used to indicate that a user has a use permission for a corresponding functionality of the target application, wherein each of the at least two permission codes corresponds to one different functionality of the target application; and
controlling, on the basis of the at least two permission codes, the use of at least two functionalities of the target application by the target user.

8. The permission control apparatus according to claim 7, wherein
before acquiring from the server, the permission control code of the target user for the target application, the operations further comprise:
acquiring a corresponding relationship between each functionality of the at least one functionality and a permission code, wherein each functionality corresponds to a different permission code.

9. The permission control apparatus according to claim 8, wherein the processing the permission control code into at least two permission codes, comprises:
performing prime factorization on the permission control code to obtain the at least two permission codes.

10. The permission control apparatus according to claim 7, wherein the processing the permission control code into at least two permission codes, comprises:
determining whether the permission control code is divisible by a specified permission code; and
determining, in response to determining the permission control code being divisible by the specified permission code, that the specified permission code is one of the at least two permission codes.

11. The permission control apparatus according to claim 7, wherein a number of permission control codes corresponding to the target user is at least two.

12. The permission control apparatus according to claim 7, wherein the controlling, on the basis of the at least two permission codes, the use of at least two functionalities of the target application by the target user, comprises:
receiving a use request operation of the target user on a target functionality of the target application;
opening, in response to determining the target functionality being a functionality corresponding to a permission code in the at least two permission codes, a use permission of the target functionality to the target user; and
restricting, in response to determining the target functionality being not a functionality corresponding to the permission code in the at least two permission codes, the use permission of the target functionality to the target user.

13. A non-transitory computer readable storage medium, storing a computer program thereon, the program, when executed by a processor, causes the at least one processor to perform operations, the operations comprising:
acquiring, in response to detecting a login operation of the target user on the target application, from the server, the permission control code of the target user for the target application, wherein the permission control code is a product of at least two permission codes, and each of the at least two permission codes is a prime number;
processing the permission control code into at least two permission codes, at least two permission codes being used to indicate that a user has a use permission for a corresponding functionality of the target application, wherein each of the at least two permission codes corresponds to one different functionality of the target application; and
controlling, on the basis of the at least two permission code, the use of at least two functionalities of the target application by the target user.

14. The non-transitory computer readable storage medium according to claim 13, wherein
before acquiring from the server, the permission control code of the target user for the target application, the operations further comprise:
acquiring a corresponding relationship between each functionality of the at least one functionality and a permission code, wherein each functionality corresponds to a different permission code.

15. The non-transitory computer readable storage medium according to claim 14, wherein the processing the permission control code into at least two permission codes, comprises:
performing prime factorization on the permission control code to obtain the at least two permission codes.

16. The non-transitory computer readable storage medium according to claim 13, wherein the processing the permission control code into at least two permission codes, comprises:
determining whether the permission control code is divisible by a specified permission code; and
determining, in response to determining the permission control code being divisible by the specified permission code, that the specified permission code is one of the at least two permission codes.

17. The non-transitory computer readable storage medium according to claim 13, wherein a number of permission control codes corresponding to the target user is at least two.

18. The non-transitory computer readable storage medium according to claim 13, wherein the controlling, on the basis of the at least two permission codes, the use of at least two functionalities of the target application by the target user, comprises:

receiving a use request operation of the target user on a target functionality of the target application;

opening, in response to determining the target functionality being a functionality corresponding to a permission code in the at least two permission codes, a use permission of the target functionality to the target user; and restricting, in response to determining the target functionality being not a functionality corresponding to the permission code in the at least two permission codes, the use permission of the target functionality to the target user.

* * * * *